United States Patent [19]
Kalhorn et al.

[11] Patent Number: 5,682,958
[45] Date of Patent: Nov. 4, 1997

[54] REAR WHEEL ASSIST FOR A SELF-PROPELLED SCRAPER

[75] Inventors: George Paul Kalhorn, Dubuque; Arvid Harlan Saele, Peosta; Larry Gene DeVore, Oskaloosa; Duane Allen Harthoorn, Sully, all of Iowa

[73] Assignee: Deere & Company, Moline, Ill.

[21] Appl. No.: 529,768

[22] Filed: Sep. 18, 1995

[51] Int. Cl.$^6$ .................................................. B60K 17/10
[52] U.S. Cl. .................... 180/308; 180/307; 180/242; 180/249; 180/14.3
[58] Field of Search ........................ 180/305, 306, 180/307, 308, 234, 242, 243, 247, 248, 249, 14.1, 14.2, 14.3, 14.4

[56] References Cited

U.S. PATENT DOCUMENTS

| | | | |
|---|---|---|---|
| 3,263,767 | 8/1966 | Rockwell | 180/14.3 X |
| 3,584,698 | 6/1971 | Larson et al. | 180/14.3 |
| 3,612,202 | 10/1971 | Moon, Jr. et al. | 180/14.3 |
| 3,656,570 | 4/1972 | Gortnar et al. | 180/308 X |
| 3,981,374 | 9/1976 | Johns, Jr. | 180/14.3 |
| 4,128,952 | 12/1978 | Duke et al. | 37/423 |
| 4,183,419 | 1/1980 | Henn et al. | 180/243 |
| 4,186,816 | 2/1980 | Pfundstein | 180/243 |
| 4,207,691 | 6/1980 | Hyler et al. | 37/413 |
| 4,244,184 | 1/1981 | Baldauf et al. | 180/308 X |
| 4,304,419 | 12/1981 | Richardson | 280/460.1 |
| 4,373,605 | 2/1983 | Sheppard, Sr. | 180/308 |
| 4,942,934 | 7/1990 | Moriarty | 180/6.48 |
| 5,147,010 | 9/1992 | Olson et al. | 180/308 X |

*Primary Examiner*—Kevin Hurley

[57] ABSTRACT

A scraper is provided with a hydrostatic rear wheel assist that is operated by foot pedals in the operators cab. A reversible variable displacement hydrostatic pump is operatively coupled to an engine mounted to the front frame section of the scraper. An engagement/disengagement valve is hydraulically positioned between the pump and the rear wheel hydraulic motors. The engagement/disengagement valve has two positions: a engagement position for directing pressurized hydraulic fluid to the motors and a disengagement position for preventing the flow of pressurized hydraulic fluid to the motors. In its disengagement position the wheel motors are free to free wheel as the motors are coupled to sump. A traction control valve is positioned between the engagement/disengagement valve and the wheel motors. The traction control valve has an uncontrolled flow divider position and a differential lock or controlled flow divider position. Both valves are operated by an electrical controller.

15 Claims, 3 Drawing Sheets

REAR WHEEL ASSIST FOR A SELF-PROPELLED SCRAPER

BACKGROUND OF THE INVENTION

1. Field of the Invention

The invention is directed to a hydrostatic rear wheel assist drive system for a self-propelled scraper.

2. Description of the Prior Art

Self-propelled scrapers are large rubber tired work vehicles that load, haul, dump and spread earth. They are used in road building, site preparation and other construction related work. In addition small scrapers have been used in large feedlots to load, haul and dump manure. One type of self-propelled scraper is an elevating scraper. These scrapers are provided with an elevator or conveyor for self loading earth into the scraper bowl.

Self-propelled scrapers are large articulated machines having a front frame section that is pivotally coupled to a rear frame section. An engine and transmission are mounted to the front frame section and drive the front wheels. The rear frame section is provided with a bowl for hauling earth, and the elevating structure, if the scraper is of an elevating type.

Self-propelled scrapers may be operated in a wide variety of traction conditions. The rear of many scrapers is provided with a push beam or stinger. A bulldozer can be used to push the stinger and assist in propelling the scraper through poor traction conditions. In addition, many large scrapers are provided with a rear mounted engine and transmission for driving the rear wheels. Such scrapers are disclosed in U.S. Pat. Nos. 4,128,952, 4,207,691 and 4,304,419. In addition, hydraulic rear wheel drive assist has been proposed in U.S. Pat. No. 3,981,374.

Hydrostatic front wheel drive has been used on motor graders, see U.S. Pat. Nos. 4,183,419 and 4,186,816. In addition, hydrostatic assists have been proposed for belted crawlers, see U.S. Pat. No. 4,942,934.

SUMMARY

It is an object of the present invention to provide a rear wheel drive assist that is particularly well adapted for a work vehicle, such as a scraper.

The present invention comprises a work vehicle having a front frame section and a rear frame section that are pivotally coupled to one another. Each frame section is provided with left and right wheels. The front wheels are driven by an engine, transmission and axle that are mounted to the front frame section. The axle is provided with a differential having a differential lock mechanism for locking the wheels together. A reversible variable displacement pump is operatively coupled to the engine on the front frame section and is hydraulically coupled to right and left wheel motors which are used to propel the right and left rear wheels. A two-position engagement/disengagement valve is hydraulically positioned between the wheel motors and the variable displacement pump. In its engagement position, pressurized fluid from the variable displacement pump is directed to the wheel motors. In its disengaged position, the wheel motors are allowed to freewheel and are disengaged from the source of the pressurized fluid.

A differential lock/flow divider valve is positioned between the engagement/disengagement valve and the wheel motors. This valve has a first differential lock, i.e. controlled—flow divider position and a second uncontrolled flow divider position. When the differential lock is activated by the operator, the valve is shifted to its differential lock position so that the right and left rear wheels are driven together to provide maximum traction effort. When the operator releases the differential lock, this valve shifts back to its uncontrolled flow divider position, which divides the flow of fluid between the two rear motors as a conventional tee would. This arrangement increases efficiency as the controlled flow divider position restricts oil flow which dissipates energy.

The direction of the fluid flow from the reversible variable displacement pump is controlled by a controller having sensors which sense the direction in which the operator has shifted the transmission. More specifically, if the operator shifts the transmission into reverse, a reverse signal from a sensor is directed to the controller which in turn shifts the swash plate on the reversible variable displacement pump so that it supplies hydraulic fluid for the reverse operation of the left and right motors. Similarly, if a forward signal is given to the controller, the controller shifts the swash plate so that the pump supplies fluid forward driving the wheel motors in a forward direction.

To cool the hydraulic fluid a special cooling circuit is provided having first and second fans. The fans and oil cooler are mounted to one of the fenders on the front frame of the vehicle. As the temperature rises in the oil, a temperature sensor directs the temperature signal to the fan controller which first switches on a first fan and then a second fan as the temperature continues to rise. If the oil temperature reaches a specified maximum amount, a warning alarm is activated.

DETAILED DESCRIPTION

Figure 1:
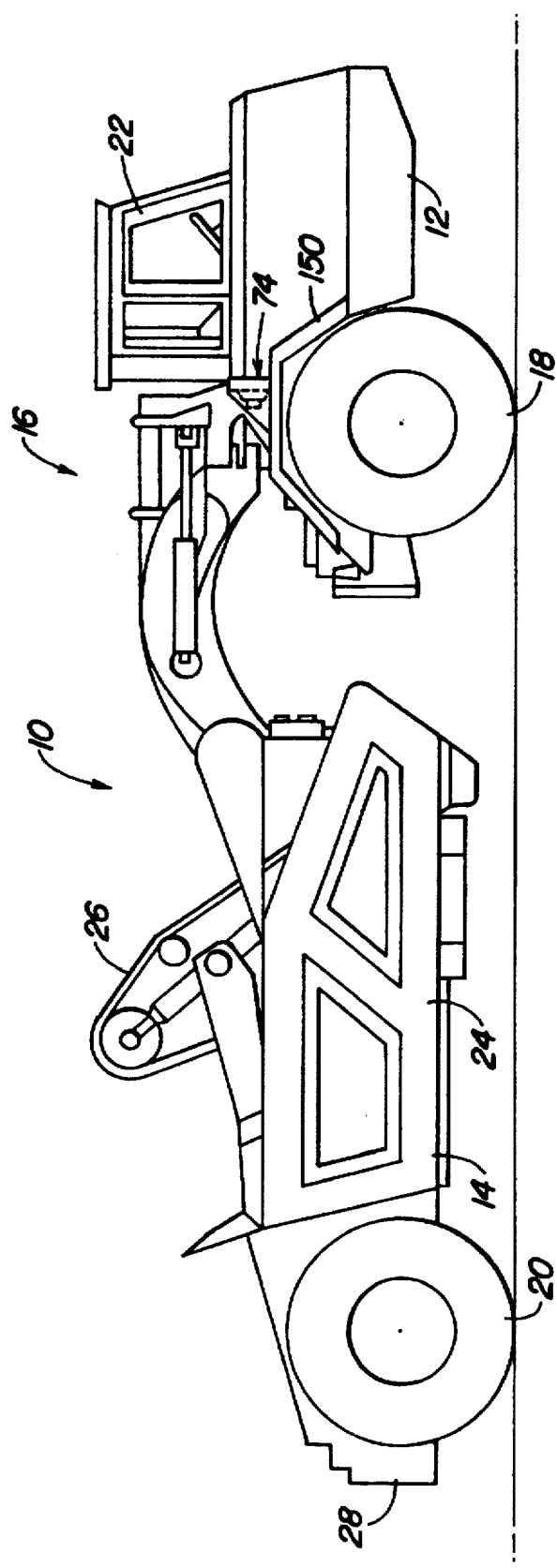
FIG. 1 is a side view of an elevating scraper.
Figure 5:
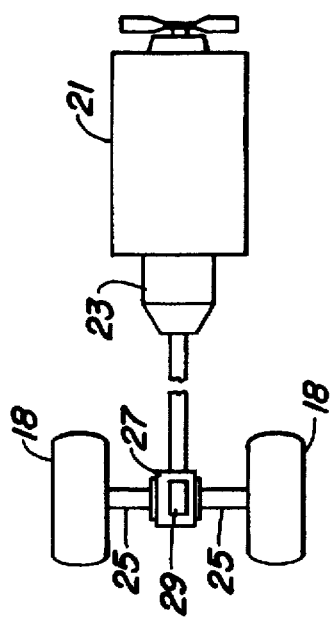
FIG. 5 is a schematic of the drive train.

Elevating scraper 10 in FIG. 1 is provided with a front frame section 12 and a rear frame section 14 which are pivotally coupled to one another at 16. The front frame section is provided with left and right wheels 18 and the rear frame section 14 is provided with left and right wheels 20. The front frame section houses an engine 27 and transmission 23 with associated axle 25 and differential 27 for driving front wheels 18. In addition, the front frame section is provided with an operator's cab from which an operator controls the operation of the vehicle. The axle 25 is provided with a differential lock 29 for increasing traction effort in difficult traction conditions. The differential lock 29 is actuated by an operator depressing a pedal in the operator's cab 22. The differential lock in turn, locks the wheels together so they rotate at the same speed. The rear frame section 14 of the vehicle is provided with a bowl 24 having an elevator structure 26 for loading the bowl with earth. A stinger or push beam 28 is located behind the rear wheels and is used by a bulldozer for pushing the scraper.

Figure 2:
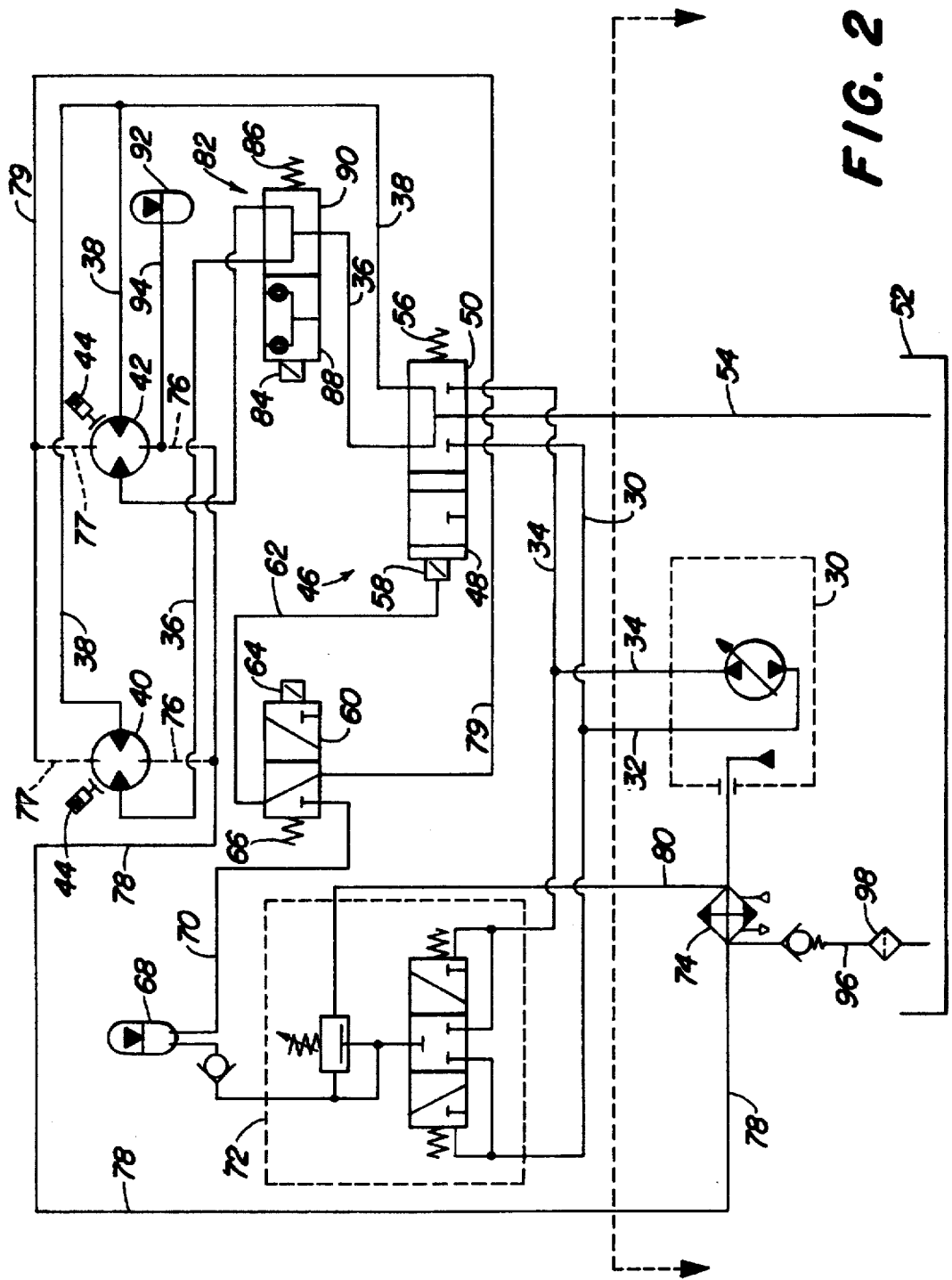
FIG. 2 is a hydraulic schematic of the present invention.

The engine housed in the front frame section is operative coupled to a reversible variable displacement pump 30, schematically illustrated in FIG. 2. This pump may be a Sauer-Sundstrand Series 90 pump marketed by Sauer-Sundstrand, Inc. of Ames, Iowa. Depending on the direction of the pump, pressurized hydraulic fluid is received from and directed through first, second, third and fourth hydraulic supply/return lines 32, 34, 36 and 38. The third and fourth supply/return lines 36 and 38 are hydraulically coupled to left and right hydraulic wheel motors 40 and 42, respectively. These motors are provided with brakes 44 and are marketed by North American Hydraulics Inc. of Houston, Tex.

First and third supply/return lines 32 and 36 are the forward supply/return lines. That is, these supply/return lines are used to supply pressurized fluid for the rear motors operating the wheel motors in a forward direction. The second and fourth supply/return lines 34 and 38 are the reverse supply/return lines and are used to supply pressurized fluid for operating the wheel motors in a reverse direction.

A two-position engagement/disengagement valve 46 is hydraulically positioned between the wheel motors and the reversible variable displacement pump. This valve has an engagement position 48 and a disengagement position 50. When this valve is shifted to its engagement position 48 hydraulic fluid is free to pass from the pump to the motors. In its disengagement position 50, the motors are allowed to freewheel and are coupled to sump 52 by sump line 54.

The engagement/disengagement valve 46 is spring biassed into the disengagement position 50 by spring 56. The other end of the valve 58 is hydraulically coupled to a two-position solenoid valve 60 by hydraulic line 62. This two-position valve is provided with a solenoid 64 and a biassing spring 66. This valve is coupled to an accumulator 68 by hydraulic line 70. When solenoid 64 is energized, valve 60 is shifted so that pressurized hydraulic fluid from accumulator 68 can flow through hydraulic line 70 and 62 to end cap 58 of the engagement/disengagement valve 46. Applying pressurized fluid to end cap 58 shifts valve 46 to its engagement position 48 thereby driving the left and right wheel motors 40 and 42.

The accumulator 68 is coupled to a Iccp flushing valve 72. The Iccp flushing valve is used to continually flush the oil circuit through an oil cooler 74. This valve is marketed by J. N. Fauver Co., of Madison Heights, Mich. The accumulator 68 is used to insure sufficient pressure in shifting valve 46.

Each of the wheel motors 40 and 42 is provided with first and second case drains 76 and 77, respectively. The first case drains 76 are hydraulically coupled to hydraulic lines 78. Line 78 are connected to oil cooler 74. In addition, the loop flushing valve 72 is also coupled to oil cooler 74 through hydraulic line 80. The second case drains are hydraulically coupled to hydraulic line 79. Line 79 is connected to valve 60.

A two-position differential lock/flow divider valve 82 is positioned between engagement/disengagement valve 46 and the wheel motors 40 and 42 along the third supply/return line 36. This valve is a Fauver Traction Control Valve. It is marketed by J. N. Fauver Co.,. It is provided with a solenoid 84 and a biassing spring 86. It has a differential lock or controlled flow divider position 88 and an uncontrolled flow divider position 90. In its differential lock or controlled flow divider position 88, this valve controls the flow to the left and right wheel motors so that they are rotated at substantially the same speed. In its uncontrolled flow divider position 90, this valve operates as a conventional tee conduit for wheel motors 40 and 42.

An accumulator 92 is hydraulically coupled to the first case drains 76 of wheel motors 40 and 42 by hydraulic line 94. This accumulator maintains case pressure in the wheel motors to cushion and dampen high pressure spikes due to inconsistent traction conditions. It should be noted that the Sauer-Sundstrand Series 90 pump 30 is provided with a charge pump, not shown, which is coupled to sump 52 for making up hydraulic fluid in the reversible variable displacement pump. The oil cooler 74 is coupled to sump 52 by return line 96 which is provided with a filter 98.

Figure 3:
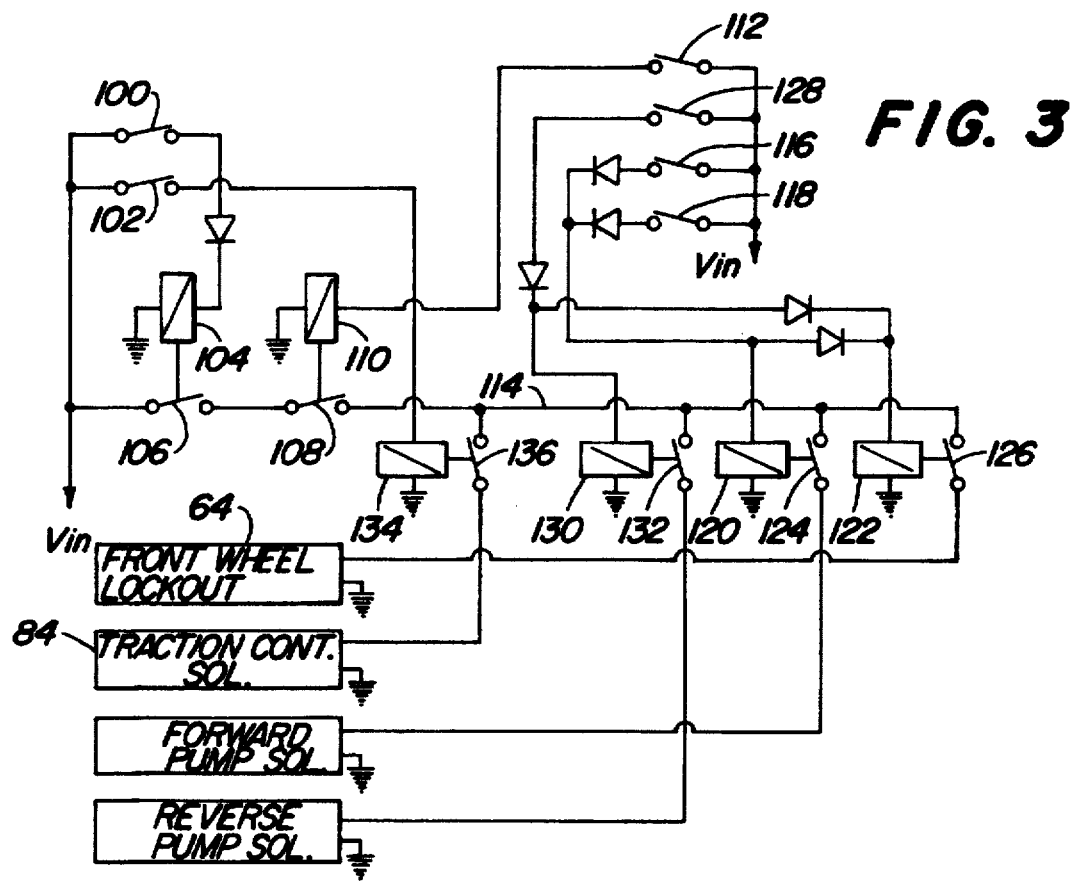
FIG. 3 is an electric schematic of the present invention.

The two downwardly projecting arrows are used to indicate what elements are located on the front frame section of the vehicle. Those elements lying above this arrow line are mounted to the rear frame section of the vehicle. The hydraulic schematic FIG. 3, illustrates the controller used in controlling the electric system above. The control system is provided with two pedal switches 100 and 102. The first foot pedal switch 100 is the engagement switch. More specifically, by depressing switch 100 the operator energizes solenoid 104 which closes switch 106. Switch 106 is coupled in series with switch 108 which is actuated by solenoid 110. Solenoid 110 is energized by closing switch 112 which is coupled to the transmission controller of the vehicle and indicates if the vehicle is in gear. If switch 106 is closed, that is the operator has depressed foot pedal 100, and switch 108 is closed, that is the transmission is in gear, then electric line 114 is energized.

Switch 116 and 118 of the transmission control system indicates whether the vehicle is in first or second gear. If the vehicle is in first or second gear one of these switches are closed. Closing switches 116 and 118 energizes solenoids 120 and 122 closing switches 124 and 126, respectively. Switch 124 is coupled to the forward pump solenoid which is used to operate pump 30 so that it is operated in a forward mode. Switch 126 is coupled to solenoid 64 which is the front wheel lockout solenoid which is used to shift the engagement/disengagement valve 46 from its disengagement position 50 to its engagement position 48 thereby allowing the flow of fluid from the pump to proceed to the wheel motors 40 and 42.

Switch 128 is part of the transmission and is used to determine if the transmission has been shifted into a reverse position. If the transmission is in reverse, solenoids 130 and 122 are energized. Energizing solenoid 130 closes switch 132 which energizes the reverse pump solenoid to insure that the pump is running in a reverse direction. As with in the forward direction, energizing solenoid 122 closes switch 126 which in turn energizes solenoid 64 which shifts the engagement/disengagement valve 46.

Going back now to foot pedal 102, foot pedal 102 is a differential lock pedal for the main transmission. When the differential lock pedal is depressed, switch 102 is closed energizing solenoid 134. Energizing solenoid 134 closes switch 136 which in turn energizes the traction control solenoid 84. When traction control solenoid 84 is energized differential lock/flow divider valve 82 is shifted from an uncontrolled flow divider position 90 to a differential lock or controlled flow divider position 88.

The above discussed controller is a simple electronic system utilizing solenoids and switches to control the operation of the rear wheel drive illustrated in FIG. 2.

Figure 4:
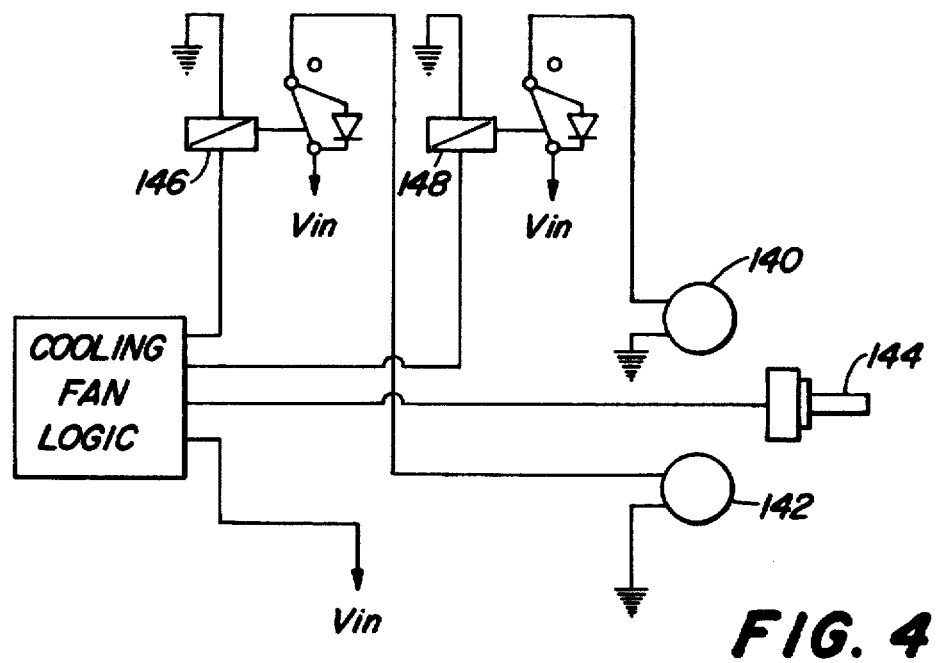
FIG. 4 is an electric schematic of the oil cooling system.

FIG. 4 discloses a cooling fan circuit. The cooling fan circuit is used to drive cooling fans 140 and 142. Cooling fan circuit is provided with a temperature sensor 144 which senses the temperature of hydraulic fluid passing through oil cooler 74 through which air from the fans 140 and 142 are blown. In response to a preset temperature of the oil, the cooling fan logic first triggers cooling fan 142 by energizing solenoid 146 which in turn starts fan 142. As the temperature in the oil continues to increase as detected by temperature sensor 144, the cooling fan logic energizes a second solenoid 148 which is used to drive fan 140. If the temperature continues to increase above this preset level the cooling fan circuit can be used to shut down the rear wheel assist.

As illustrated in FIG. 1, the fans 140 and 142 and the oil cooler 74 are mounted to the right front fender 150 of the scraper. This mounting location keeps the oil cooler and fans above the dirt and dust and is also exposed to a breeze from the movement of the scraper.

The present invention should not be limited by the above-described embodiments but should be limited solely by the claims that follow.

We claim:

1. A work vehicle for performing a work operation, the work vehicle comprising:

an articulated frame having a front frame section and a rear frame section that are pivotally coupled to one another, the front frame section having left and right front wheels and the rear frame section having left and right rear wheels;

an engine mounted to the front frame section;

a main transmission mounted to the front frame section being driven by the engine, the main transmission having an axle for driving the left and right front wheels;

a reversible variable displacement pump mounted to the front frame being driven by the engine;

a left hydraulic motor being coupled to the left rear wheel for driving the left rear wheel;

a right hydraulic motor being coupled to the right rear wheel for driving the right rear wheel;

a two-position engagement/disengagement valve being hydraulically positioned between the left and right hydraulic motors and the reversible variable displacement pump, the engagement/disengagement valve has an engagement position for directing hydraulic fluid to and from the left and right hydraulic motors to and from the reversible variable displacement pump, and a disengagement position for hydraulically disengaging the left and right hydraulic motors from the reversible variable displacement pump;

first and second supply/return lines extending between the reversible variable displacement pump and the engagement/disengagement valve for directing hydraulic fluid to and from the engagement/disengagement valve;

third and fourth supply/return lines extending between the engagement/disengagement valve and the left and right hydraulic motors for directing hydraulic fluid to and from the left and right hydraulic motors; and a controller for shifting the engagement/disengagement valve to its engagement position when a floor pedal on the front frame is depressed by an operator, the controller shifts the engagement/disengagement valve into its disengagement position when the floor pedal is released.

2. A work vehicle as defined by claim 1 wherein the axle of the main transmission is provided with a differential lock for locking the right and left front wheels together when the differential lock is applied by an operator.

3. A work vehicle as defined by claim 2 further comprising a differential lock/flow divider valve being hydraulically positioned between the left and right hydraulic motors and the engagement/disengagement valve on the third supply/return line, the differential lock/flow divider valve has a controlled flow divider position which divides hydraulic fluid in the third supply/return line between the left and right hydraulic motors so they are rotated at the same speed, the differential lock/flow divider valve has a uncontrolled flow dividing position, the controller is provided with a differential lock sensor for detecting if the differential lock has been applied and providing a differential lock signal, if the controller receives a differential lock signal the differential lock/flow divider valve is shifted to its controlled flow divider lock position if no differential lock signal is received the differential lock/flow divider valve is maintained in its uncontrolled flow divider position.

4. A work vehicle as defined by claim 3 wherein the first and third supply/return lines direct pressurized fluid from the reversible variable displacement pump to the left and right hydraulic motors so that the left and right rear wheels are rotated in a forward direction.

5. A work vehicle as defined by claim 4 wherein the second and fourth supply/return lines direct pressurized fluid from the reversible variable displacement pump to the left and right hydraulic motors so that the left and right rear wheels are rotated in a reverse direction.

6. A work vehicle as defined by claim 5 wherein the left and right hydraulic motors are left and right wheel motors, respectively.

7. A work vehicle as defined by claim 6 wherein the left and right wheel motors are provided with case drains and one of the case drains is coupled to an accumulator for maintaining case pressure and dampening pressure spikes due to inconsistent traction conditions.

8. A work vehicle as defined by claim 7 wherein the engagement/disengagement valve is a spring biased hydraulically shifted valve having an end cap, the end cap of the engagement/disengagement is hydraulically coupled to a two-position solenoid valve having a flow position and a closed position, when the two-position solenoid valve is in its flow position the two-position solenoid valve directs pressurized fluid to the end cap of the engagement/disengagement valve shifting the engagement/disengagement valve to its engagement position.

9. A work vehicle as defined by claim 8 wherein the two-position solenoid valve is hydraulically coupled to a second accumulator which stores hydraulic pressure for shifting the engagement/disengagement valve.

10. A work vehicle as defined by claim 9 wherein the second accumulator is hydraulically coupled and charged by a lccp flushing valve which continually flushes hydraulic fluid through an oil cooler.

11. A work vehicle as defined by claim 10 wherein the oil cooler is provided with first and second cooling fans.

12. A work vehicle as defined by claim 11 wherein the oil cooler is provided with a temperature sensor for sensing hydraulic fluid temperature and a cooling fan controller for triggering the first and second cooling fans in response to hydraulic fluid temperature.

13. A work vehicle as defined by claim 12 wherein cooling fan controller triggers the first cooling fan at a first hydraulic fluid temperature level and triggers the second cooling fan at a higher hydraulic fluid temperature level.

14. A work vehicle as defined by claim 13 wherein the front frame section is provided with a fender to which the oil cooler is mounted.

15. A self-propelled scraper for loading, hauling, dumping and spreading earth or other materials, the scraper comprising:

an articulated frame having a front frame section and a rear frame section that are pivotally coupled to one another, the front frame section having left and right front wheels and the rear frame section having left and right rear wheels; an engine mounted to the front frame section;

a main transmission mounted to the front frame section being driven by the engine, the main transmission having an axle for driving the left and right front wheels;

a reversible variable displacement pump mounted to the front frame being driven by the engine;

a left hydraulic motor being coupled to the left rear wheel for driving the left rear wheel;

a right hydraulic motor being coupled to the right rear wheel for driving the right rear wheel;

a two-position engagement/disengagement valve being hydraulically positioned between the left and right hydraulic motors and the reversible variable displacement pump, the engagement/disengagement valve has an engagement position for directing hydraulic fluid to and from the left and right hydraulic motors to and from the reversible variable displacement pump, and a disengagement position for hydraulically disengaging the left and right hydraulic motors from the reversible variable displacement pump;

first and second supply/return lines extending between the reversible variable displacement pump and the engagement/disengagement valve for directing hydraulic fluid to and from the engagement/disengagement valve;

third and fourth supply/return lines extending between the engagement/disengagement valve and the left and right hydraulic motors for directing hydraulic fluid to and from the left and right hydraulic motors; and an oil cooler for cooling hydraulic fluid the oil cooler is mounted to a fender on the front frame of the scraper.

* * * * *

UNITED STATES PATENT AND TRADEMARK OFFICE
CERTIFICATE OF CORRECTION

PATENT NO. : 5,682,958
DATED : November 4, 1997
INVENTOR(S) : George Paul Kalhorn et al.

It is certified that error appears in the above-identified patent and that said Letters Patent is hereby corrected as shown below:

Column 6, line 47, delete "Iccp" and insert -- loop --.

Signed and Sealed this

Sixteenth Day of June, 1998

Attest:

BRUCE LEHMAN

Attesting Officer

Commissioner of Patents and Trademarks